US008480474B2

(12) United States Patent
Randall et al.

(10) Patent No.: US 8,480,474 B2
(45) Date of Patent: Jul. 9, 2013

(54) GAMING MACHINES AND METHODS OF DISPLAYING ANIMATED SYMBOLS ON MECHANICAL REELS

(75) Inventors: Julia Janeen Randall, Reno, NV (US); Brian Keith Baker, Reno, NV (US); Jean Pierre Legras, Washoe Valley, NV (US); Gene Elvin Powell, Reno, NV (US); Stewart Thoeni, Reno, NV (US); Mark Woodard, Reno, NV (US)

(73) Assignee: IGT, Reno, NV (US)

( * ) Notice: Subject to any disclaimer, the term of this patent is extended or adjusted under 35 U.S.C. 154(b) by 364 days.

(21) Appl. No.: 12/563,716

(22) Filed: Sep. 21, 2009

(65) Prior Publication Data

US 2011/0070939 A1 Mar. 24, 2011

(51) Int. Cl.
*G06F 17/00* (2006.01)

(52) U.S. Cl.
USPC .............................................. 463/20; 463/31

(58) Field of Classification Search
USPC ......................................... 463/16–22, 30–34
See application file for complete search history.

(56) References Cited

U.S. PATENT DOCUMENTS

| | | | | |
|---|---|---|---|---|
| 4,659,182 | A | 4/1987 | Aizawa | |
| 5,395,111 | A | 3/1995 | Inoue | |
| 5,580,055 | A | 12/1996 | Hagiwara | |
| 6,027,115 | A | 2/2000 | Griswold et al. | |
| 6,056,642 | A | 5/2000 | Bennett | |
| 6,190,254 | B1 | 2/2001 | Bennett | |
| 6,270,411 | B1 | 8/2001 | Gura et al. | |
| 6,517,433 | B2 | 2/2003 | Loose et al. | |
| 6,551,187 | B1 | 4/2003 | Jaffe | |
| 6,561,900 | B1 | 5/2003 | Baerlocher et al. | |
| 6,641,478 | B2 | 11/2003 | Sakai | |
| 6,656,046 | B1 * | 12/2003 | Yoseloff et al. | 463/20 |
| 6,731,313 | B1 | 5/2004 | Kaminkow | |
| 6,976,915 | B2 | 12/2005 | Baker et al. | |
| 7,019,741 | B2 * | 3/2006 | Kelly et al. | 345/419 |
| 7,160,187 | B2 | 1/2007 | Loose et al. | |
| 7,309,284 | B2 | 12/2007 | Griswold et al. | |
| 7,316,395 | B1 | 1/2008 | Kromydas | |
| 7,380,791 | B2 * | 6/2008 | Gauselmann et al. | 273/142 B |
| 7,402,102 | B2 | 7/2008 | Marks et al. | |
| 7,708,635 | B2 * | 5/2010 | Walker et al. | 463/20 |
| 2008/0113736 | A1 | 5/2008 | Shackelford et al. | |
| 2009/0131145 | A1 * | 5/2009 | Aoki et al. | 463/20 |
| 2009/0286589 | A1 * | 11/2009 | Rasmussen | 463/20 |
| 2010/0048281 | A1 * | 2/2010 | Kearns et al. | 463/20 |

* cited by examiner

*Primary Examiner* — Michael Cuff
(74) *Attorney, Agent, or Firm* — Foley & Lardner LLP

(57) ABSTRACT

A gaming machine includes a reel assembly and a processor operatively coupled to the reel assembly. The reel assembly includes at least one slot reel including a reel strip having a plurality of symbols positioned thereon. At least a portion of the plurality of symbols includes a plurality of frames. The at least one slot reel is configured to rotate about an axis. The reel assembly also includes at least one light device positioned with respect to the slot reel to selectively illuminate the plurality of symbols. The processor is configured to control the light device to progressively illuminate at least a portion of the plurality of frames to facilitate an appearance of animation within the plurality of frames during rotation of said at least one slot reel about the axis.

32 Claims, 7 Drawing Sheets

GAMING MACHINES AND METHODS OF DISPLAYING ANIMATED SYMBOLS ON MECHANICAL REELS

BACKGROUND

The embodiments described herein relate generally to displaying and animating symbols on a gaming machine and, more particularly, to gaming machines and methods for animating and displaying symbols on a gaming machine that includes mechanically-driven slot reels.

At least some known gaming machines include slot reels that include a symbol region that contains a plurality of electroluminescent elements for use in defining reel symbols in a variety of different formats. For example, at least some known gaming machines are capable of illuminating a common reel symbol using multiple formats, including illuminating an outline of the reel symbol, illuminating a cross-hatched interior space of the reel symbol, and/or illuminating the reel symbol using multiple colors. Moreover, at least some known gaming machines include reel symbols that are inked, such that the inked reel symbols continue to be displayed when all light elements are deactivated.

Moreover, at least some known gaming machines include slot reels that are made visible to a player through a transparent panel by using a light valve that is positioned between an inner surface of the panel and the slot reels. The light valve is coupled to a power source such that the light valve is transparent when a first voltage is applied by the power source, and is opaque when a second voltage is applied by the power source. Furthermore, at least some known gaming machines include slot reels having a plurality of symbols displayed using a liquid crystal display (LCD), wherein the symbols include one or more replicators or split symbols. The split symbols display two or more of the same symbols in a single symbol position on the slot reels.

However, generally known gaming machines do not include a plurality of symbols displayed on a plurality of mechanically-driven slot reels, wherein at least a portion of the symbols include a plurality of frames that are progressively illuminated using a light device upon detection of a triggering event.

Accordingly, it is desirable to provide display of hidden symbols during prescribed time periods such as upon detection of a triggering event during play of a primary game. Moreover, it is desirable to use mechanically rotated slot reels and light devices to provide an appearance of movement and/or animation within the hidden symbols when they are displayed.

BRIEF DESCRIPTION

This Brief Description is provided to introduce a selection of concepts in a simplified form that are further described below in the Detailed Description. This Brief Description is not intended to identify key features or essential features of the claimed subject matter, nor is it intended to be used as an aid in determining the scope of the claimed subject matter.

In one aspect, a gaming machine is provided that includes a reel assembly and a processor operatively coupled to the reel assembly. The reel assembly includes at least one slot reel and at least one light device positioned with respect to the slot reel. The slot reel includes a reel strip having a plurality of symbols positioned thereon, wherein at least a portion of the plurality of symbols include a plurality of frames, and wherein the at least one slot reel is configured to rotate about an axis. The at least one light device is configured to selectively illuminate the plurality of symbols. The processor is configured to control the at least one light device to progressively illuminate at least a portion of the plurality of frames to facilitate creating an appearance of animation within the plurality of frames during rotation of said at least one slot reel about the axis.

In another aspect, a reel assembly is provided for use with a gaming machine. The reel assembly includes at least one slot reel including a reel strip having a plurality of symbols positioned thereon, wherein at least a portion of the plurality of symbols includes a plurality of frames. The reel assembly also includes at least one light device positioned with respect to the at least one slot reel, wherein the at least one light device is configured to progressively illuminate at least a portion of the plurality of frames to facilitate creating an appearance of animation within the plurality of frames.

In another aspect, a method is provided for displaying a plurality of indicia on a gaming machine. The method includes rotating at least one slot reel about an axis using a stepper motor, wherein the at least one slot reel includes a reel strip having a plurality of symbols positioned thereon, and wherein at least a portion of the plurality of symbols includes a plurality of frames. The method also includes progressively illuminating at least a portion of the plurality of frames using at least one light device to facilitate creating an appearance of animation within the plurality of frames while the at least one slot reel rotates about the axis.

In yet another aspect, a gaming system is provided. The gaming system includes a plurality of gaming machines and a server communicatively coupled to each gaming machine. Each gaming machine includes a reel assembly operatively coupled to a processor. The reel assembly includes at least one slot reel having a reel strip including a plurality of symbols positioned thereon, wherein at least a portion of the plurality of symbols includes a plurality of frames, and wherein the at least one reel is configured to rotate about an axis. The reel assembly also includes at least one light device positioned with respect to the at least one slot reel to selectively illuminate the plurality of symbols. The processor is configured to control the at least one light device to progressively illuminate at least a portion of the plurality of frames to facilitate creating an appearance of animation within the plurality of frames during rotation of said at least one slot reel about the axis. The server is configured to determine at least one gaming machine that is eligible for a bonus game, and to transmit a signal to the processor of the at least one eligible gaming machine to enable the progressive illumination of the plurality of frames.

BRIEF DESCRIPTION OF THE DRAWINGS

The embodiments described herein may be better understood by referring to the following description in conjunction with the accompanying drawings.

DETAILED DESCRIPTION

Exemplary applications of systems, methods, and apparatus according to the present invention are described herein. These examples are provided solely to add context and to aid in the understanding of the invention. It will thus be apparent to one skilled in the art that the present invention may be practiced without some or all of these specific details. In other instances, well known process steps have not been described in detail in order to avoid unnecessarily obscuring the present invention. Other applications are possible, such that the following example should not be taken as definitive or limiting either in scope or setting. In the detailed description that follows, references are made to the accompanying drawings, which form a part of the description and in which are shown, by way of illustration, specific embodiments of the present invention. Although these embodiments are described in sufficient detail to enable one skilled in the art to practice the invention, it is understood that these examples are not limiting, such that other embodiments may be used and changes may be made without departing from the spirit and scope of the invention.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Technical effects of the systems, methods, and apparatus described herein include at least one of (a) detecting a triggering event; (b) determining a spin rate of a plurality of slot reels; (c) determining a period of illumination of a light device positioned with respect to each slot reel; (d) rotating each slot reel at the determined spin rate using a stepper motor; and (e) illuminating a plurality of frames within a portion of a plurality of symbols, by strobing the light device at the determined period of illumination, thereby creating an appearance of animation and/or movement within the plurality of frames within a single slot reel and/or across all of the slot reels.

Figure 1:
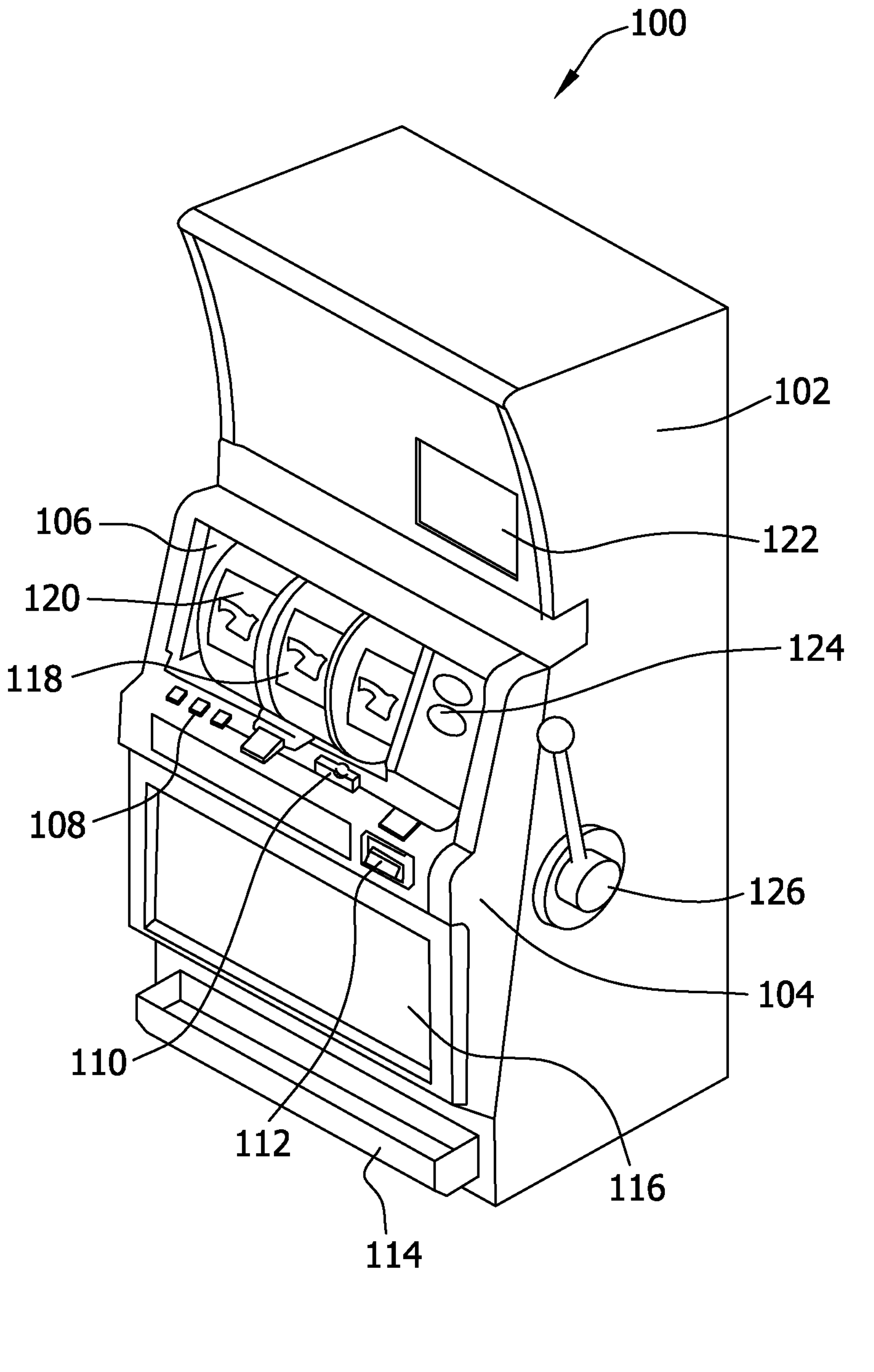
FIG. 1 is a perspective view of an exemplary gaming machine.

FIG. 1 is a perspective view of an exemplary gaming machine 100. In the exemplary embodiment, gaming machine 100 includes a main cabinet 102 that includes a main door 104 coupled to a front 106 of gaming machine 100. Main door 104 opens to provide access to an interior (not shown in FIG. 1) of gaming machine 100, and includes a locking mechanism (not shown) that limits access to the interior of gaming machine 100. A plurality of player-input buttons 108 are coupled to main door 104, along with a coin acceptor 110, a bill validator 112, a coin tray 114, and a belly glass 116. Moreover, in the exemplary embodiment, a plurality of slot reel assemblies 118 are viewable through main door 104. Each slot reel assembly 118 is covered with a reel strip (not shown in FIG. 1) that is described in more detail below. Slot reel assemblies 118 are positioned behind a display panel 120. A video display monitor 122 is located above main door 104. In one embodiment, video display monitor 122 is a cathode ray tube (CRT) monitor. In another embodiment, video display monitor 122 is a liquid crystal display (LCD) monitor. Various embodiments of gaming machine 100 may utilize video display monitor 122 to provide additional features, such as bonus games and/or attract sequences, to a base game being played on gaming machine 100.

Moreover, in the exemplary embodiment, gaming machine 100 also includes an information panel 124 that is positioned adjacent to slot reel assemblies 118. In the exemplary embodiment, information panel 124 is a back-lit, silk-screened glass panel, and includes lettering or other indicia that indicate general game information such as a number of coins played. Gaming machine 100 also includes a slot reel handle 126 that is coupled to main cabinet 102. Slot reel handle 126 may be used by a player to activate slot reel assemblies 118 during game play. In addition, the player may interact with bill validator 112, player-input buttons 108, video display monitor 122, and information panel 124 during game play. Each of these devices is controlled by circuitry (not shown in FIG. 1) housed within main cabinet 102.

During play of gaming machine 100, a player inserts cash via bill validator 112 and/or coin acceptor 110. Alternatively, the player may insert a ticket into bill validator 112, wherein the ticket is worth a predefined amount of money or credits. At the start of the game, the player initiates game play by pulling on slot reel handle 126 or by depressing one of the plurality of player-input buttons 108. During the game, the player may view additional game information and/or be presented with additional game options using video display monitor 122 and/or information panel 124. Moreover, during the game, the player may be prompted to make a number of decisions that may affect the outcome of the game. The player may input such decisions using player-input buttons 108. Further, during certain game events, gaming machine 100 may display visual effects and/or emit audible effects that are perceived by the player in order to add excitement to the game. Visual effects may include, but are not limited to only including, flashing lights, strobing lights, and/or other patterns displayed by lights (not shown) on gaming machine 100 and/or positioned behind belly glass 116. Moreover, visual effects may be displayed via patterns on video display monitor 122 and/or from lights (not shown) positioned on slot reel assemblies 118. Auditory effects may include, but are not limited to only including, various sounds that are projected by speakers (not shown). After a game is completed, the player may receive game tokens or coins from coin tray 114.

Figure 2:
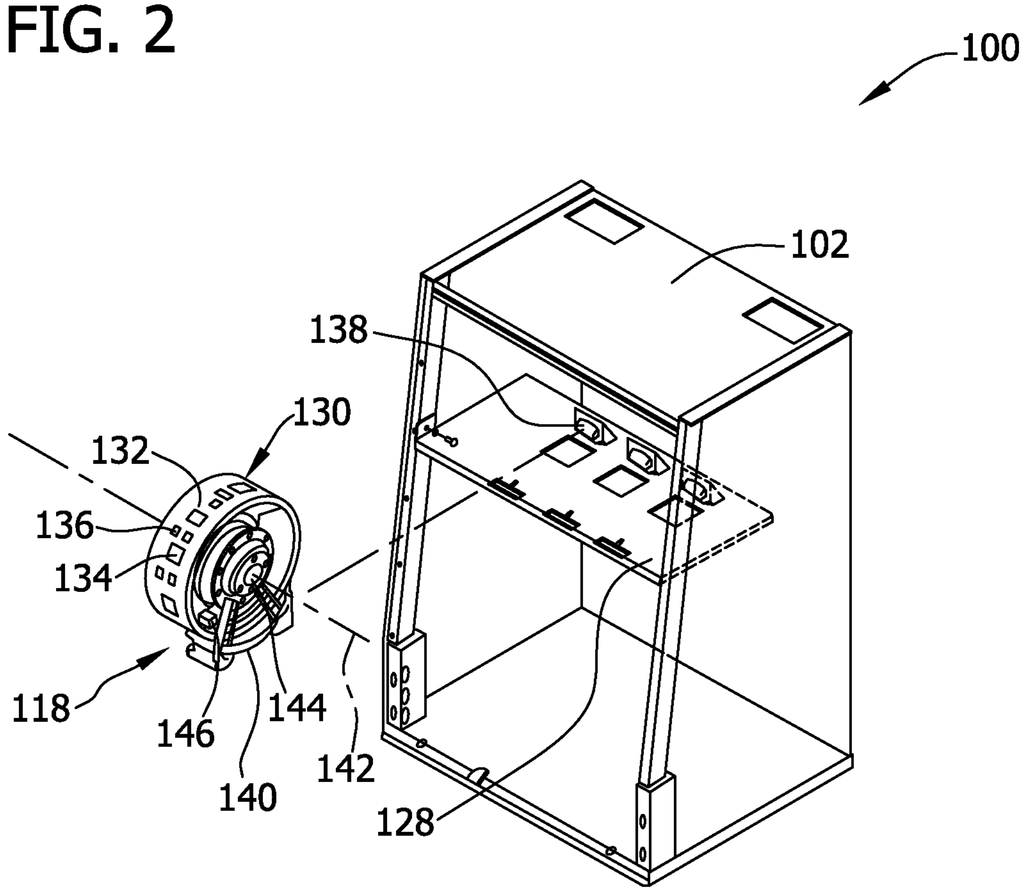
FIG. 2 is a perspective view of an exemplary slot reel assembly that may be used with the gaming machine shown in FIG. 1.

FIG. 2 is a perspective view of an exemplary slot reel assembly 118 that may be used with gaming machine 100. In the exemplary embodiment, a reel shelf 128 within main cabinet 102 supports multiple slot reel assemblies 118. Each slot reel assembly 118 includes a slot reel 130 that includes a reel strip 132 applied thereto. Each reel strip 132 is covered with a plurality of symbols 134 that are utilized during game play. Additionally, in the exemplary embodiment, at least a portion of symbols 134 includes a plurality of animation frames 136 that remain hidden during normal use, as described in more detail below. Moreover, in the exemplary embodiment, each slot reel assembly 118 is coupled to a mating connector 138. Mating connector 138 provides connections to a power supply (not shown) and to control circuitry (not shown) housed within main cabinet 102. Each slot reel 130 is supported by a reel chassis 140 that is mounted to reel shelf 128. Prior to game play, each slot reel 130 is typically motionless. Upon game initiation, each slot reel 130 is set in rotation about an axis 142 by a stepper motor 144 mounted to reel chassis 140. Further, slot reel assembly 118 includes one or more light devices 146 that emit light through reel strip 132. In the exemplary embodiment, light device 146 is positioned in an interior space of reel strip 132 and is oriented to direct light through reel strip 132 towards the exterior of reel strip 132.

Figure 3:
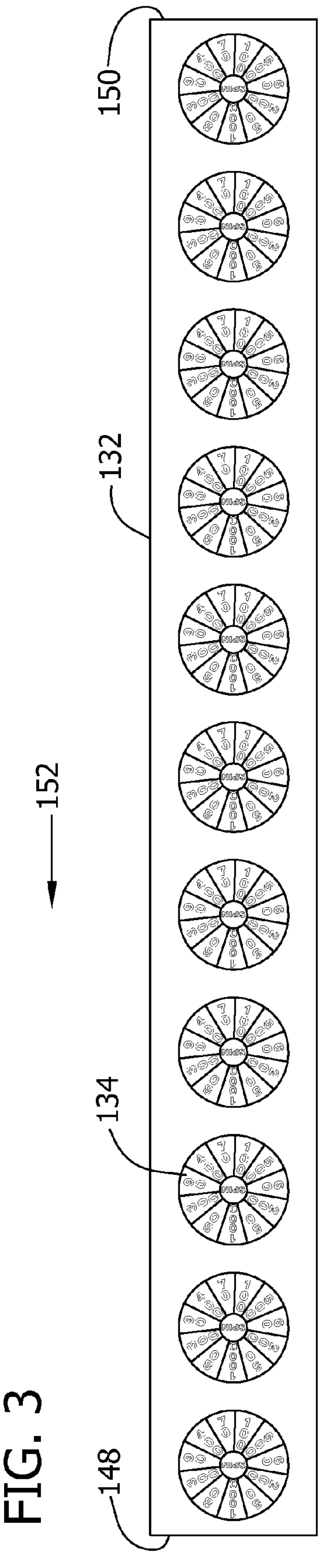
FIG. 3 is a diagram of an exemplary reel strip that may be used with the slot reel assembly shown in FIG. 2.
Figure 4:
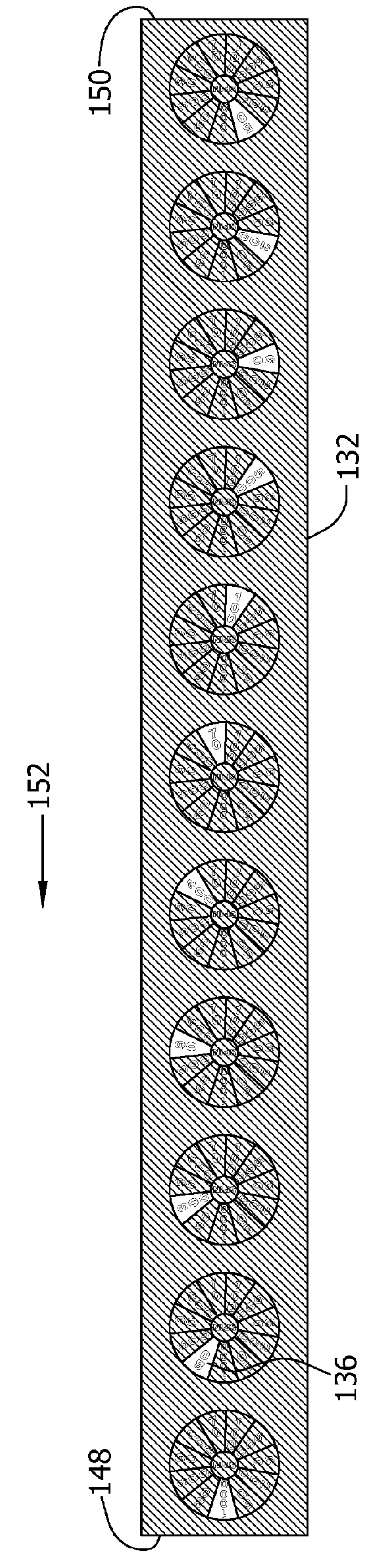
FIG. 4 is a diagram of the reel strip shown in FIG. 3 showing a sequence of illuminated frames.

FIG. 3 and FIG. 4 are diagrams of an exemplary reel strip 132 that includes a plurality of symbols 134. In the exemplary embodiment, reel strip 132 includes a first end 148, a second end 150, and symbols 134 that are spaced substantially evenly between first and second ends 148 and 150. As referenced above, at least a portion of symbols 134 includes a plurality of frames 136. As shown in FIG. 3, each symbol 134 includes a set of frames 136. FIG. 4 shows an exemplary order in which frames 136 may be illuminated by light device 140 (shown in FIG. 2). Specifically, as stepper motor 144 (shown in FIG. 2) rotates slot reel 130 (shown in FIGS. 1 and 2) about axis 142 (shown in FIG. 2), symbols 134 move past light device 140. As each respective symbol 134 is rotated past light device 140, a respective frame 136 is illuminated. The illumination of respective frame 136 occurs due to the transparency of frame 136 and the opaque properties of the rest of symbol 134. For example, as shown in FIG. 4, reel strip 132 is rotated in a direction indicated by arrow 152, although it should be understood that reel strip 132 may instead be rotated in the opposite direction. As reel strip 132 rotates, a respective frame 136 of each symbol 134 is illuminated by light device 140. More specifically, as first end 148 passes light device 140, a "1000" frame is illuminated. As rotation of reel strip 132 progresses, subsequent frames 136 are sequentially illuminated, including an "80" frame, a "300" frame, a "90" frame, and so on until second end 150 passes light device 140 at which time a "50" frame is illuminated. In some embodiments, during periods of normal play, frames 136 are not displayed to the player. Rather, frames 136 are only displayed upon the detection of a triggering event, such as a bonus outcome. Moreover, in some embodiments, slot reel 130 may be rotated about axis 142 while gaming machine 100 is not in use, such that the apparent animation provided by illuminating frames 136 serves as an attract mode or attract sequence to potential players.

Figure 5:
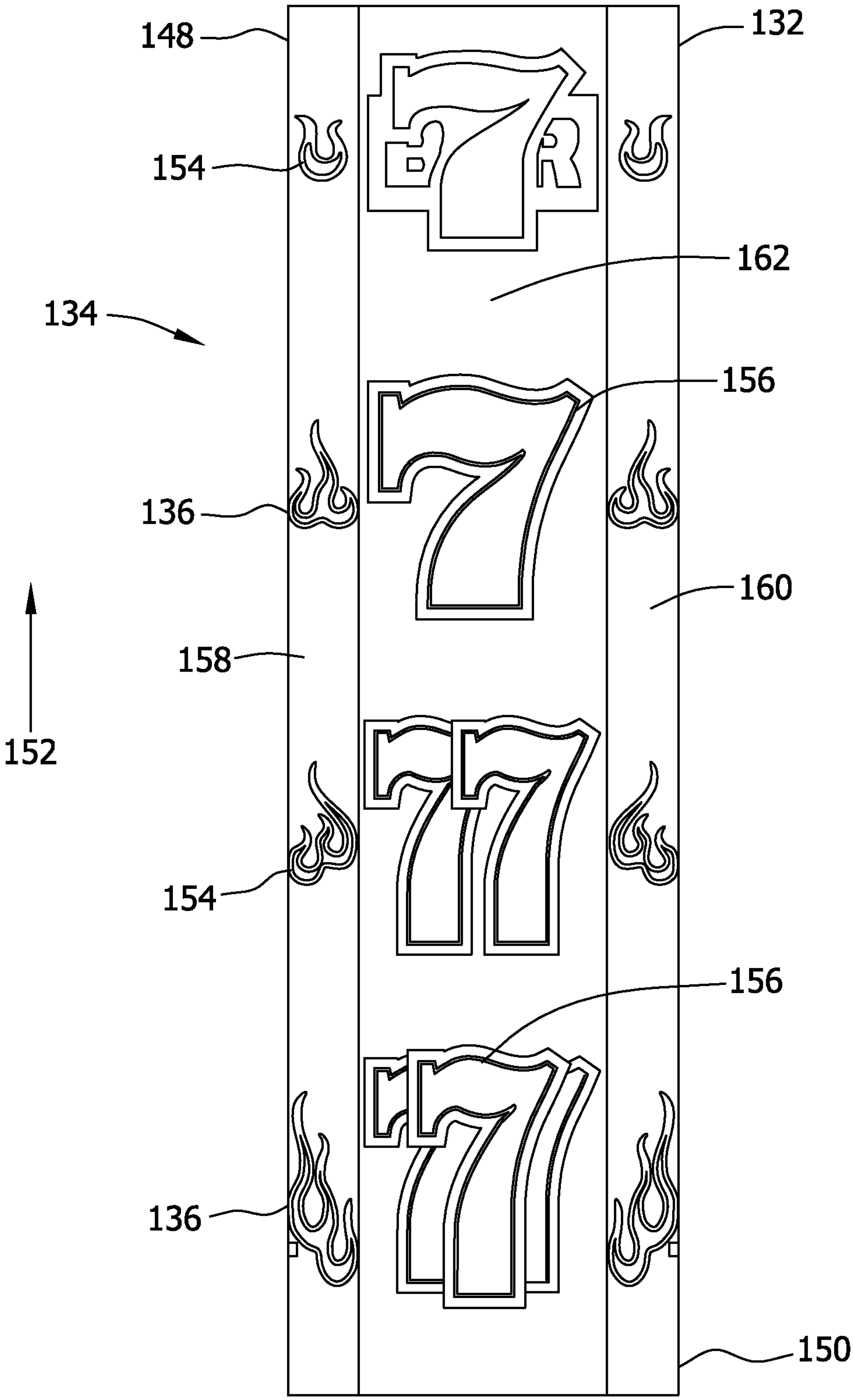
FIG. 5 is a diagram of another exemplary reel strip that may be used with the slot reel assembly shown in FIG. 2.

FIG. 5 is a diagram of another exemplary reel strip 132 that includes a plurality of symbols 134 and a plurality of frames 136. As shown in FIG. 5, symbols 134 include a first portion 154 and a second portion 156. First portion 154 is spaced substantially evenly along each of a first outside edge 158 and a second outside edge 160 of reel strip 132. Second portion 156 is spaced substantially evenly along a central region 162 of reel strip 132. In the exemplary embodiment, as stepper motor 144 (shown in FIG. 2) rotates slot reel 130 (shown in FIGS. 1 and 2) about axis 142 (shown in FIG. 2), first and second portions 154 and 156 are rotated past light device 142. In the exemplary embodiment, light device 140 is positioned with respect to reel strip 132 such that light device 140 illuminates each of first and second outside edges 158 and 160, thereby displaying hidden frames 136. As each respective symbol 134 of first portion 154 is rotated past light device 140, a respective frame 136 is illuminated. For example, reel strip 132 is rotated in a direction indicated by arrow 152, although it should be understood that reel strip 132 may instead be rotated in the opposite direction. As reel strip 132 rotates, a respective frame 136 of each symbol 134 of first portion 154 is illuminated by light device 140. In one embodiment, slot reel assembly 118 (shown in FIG. 2) also includes a second light device (not shown) that illuminates symbols 134 (or portions of symbols 134) of second portion 156 that are positioned within central region 162. Moreover, in one embodiment, each second portion symbol 134 includes a plurality of frames (not shown). In such an embodiment, a second light device (not shown) progressively illuminates each frame as reel strip 132 rotates. In some embodiments, during periods of normal play, frames 136 are not displayed to the player. Rather, frames 136 are only displayed upon the detection of a triggering event, such as a bonus outcome. Moreover, in some embodiments, slot reel 130 may be rotated about axis 142 while gaming machine 100 is not in use, such that the apparent animation provided by illuminating frames 136 serves as an attract mode or attract sequence to potential players.

Figure 6:
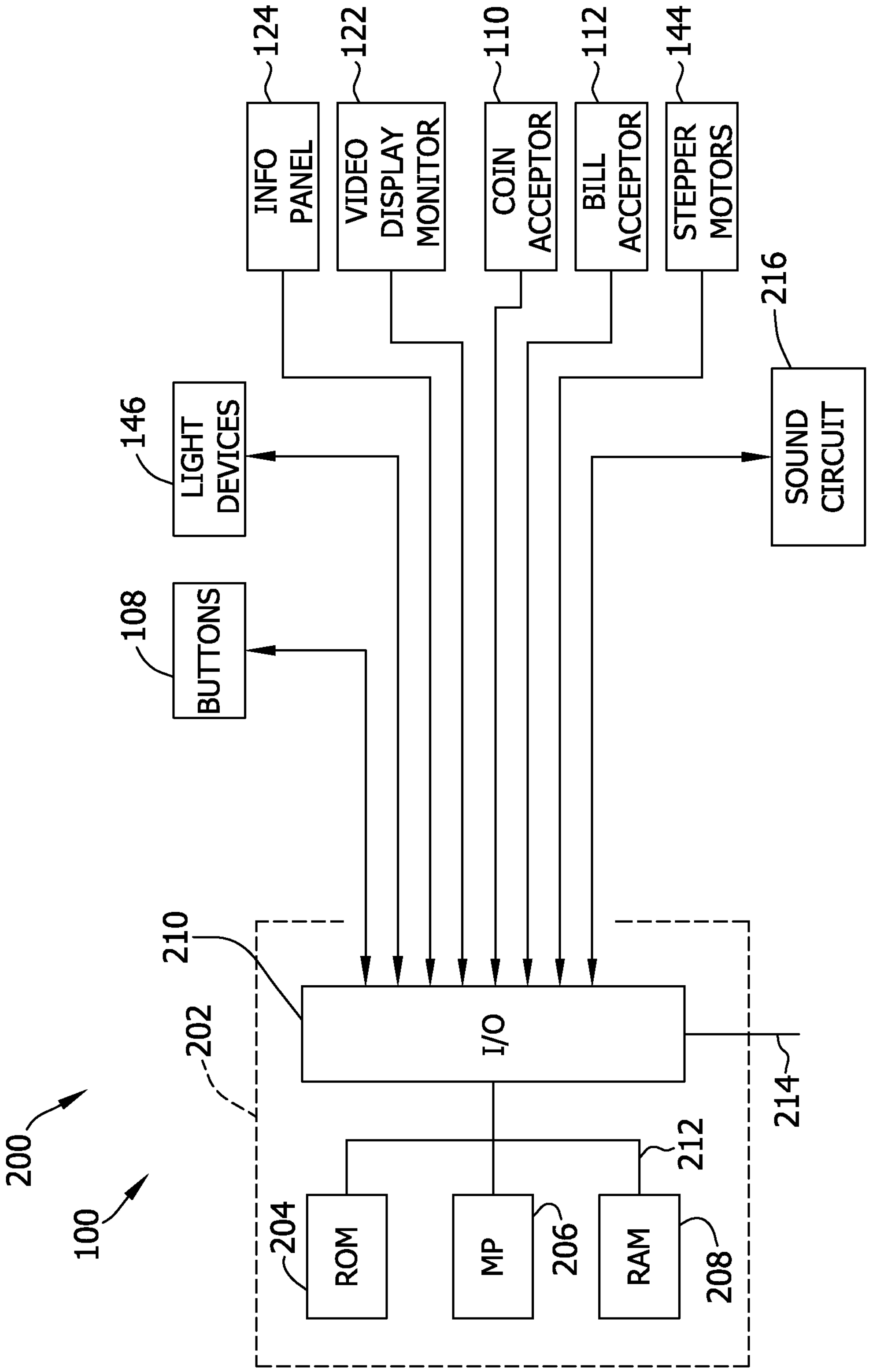
FIG. 6 is a block circuit diagram of an exemplary electrical architecture that may be used with the gaming machine shown in FIG. 1.

FIG. 6 is a block circuit diagram of an exemplary electrical architecture 200 incorporated into an exemplary gaming machine, such as gaming machine 100. In the exemplary embodiment, gaming machine 100 includes a gaming machine controller 202 that includes a read-only memory (ROM) 204, a microcontroller or microprocessor (MP) 206, a random-access memory (RAM) 208, and an input/output (I/O) circuit 210, that are each coupled via an address/data bus 212. As used herein, the terms "controller" and "processor" may include any programmable system including, but not limited to, systems using microcontrollers, reduced instruction set circuits (RISC), application specific integrated circuits (ASICs), logic circuits, and/or any other circuit or processor capable of executing the functions described herein. Such examples are exemplary only, and are thus not intended to limit in any way the definition and/or meaning of the terms "controller" or "processor". Alternative embodiments of controller 202 may include more than one microprocessor 206, multiple RAM modules 208, and/or multiple ROM modules 204. Moreover, although I/O circuit 210 is shown in FIG. 6 as a single component, one of ordinary skill in the art should appreciate that I/O circuit 210 may include any number or a plurality of different types of I/O circuits. Furthermore, RAM 208 and/or ROM 204 may be implemented as, for example, semiconductor memories, magnetically readable memories, and/or optically readable memories. In one embodiment, each operational component of gaming machine 100 is coupled to I/O circuit 210 via a respective conductor. Alternative embodiments may include only a single coupling between the operational components of gaming machine 100 and I/O circuit 210. In the exemplary embodiment, I/O circuit 210 is coupled to a gaming network (not shown) via a network interface 214. Moreover, in the exemplary embodiment, architecture 200 includes a sound circuit 216 that generates audio signals and that communicates audio signals between I/O circuit 210 and speakers (not shown).

During operation, an outcome of a game is typically determined by symbols 134 displayed to the player on each slot reel 130. Different combinations of symbols 134 may result in different game outcomes. The probability of a particular symbol 134 appearing on a slot reel 130 may be determined by software residing on gaming machine controller 202. When a game is initiated by a player, gaming machine controller 202 randomly selects a particular symbol 134 that should appear on each slot reel 130. Gaming machine controller 202 transmits instructions to a slot reel controller (not shown) to initiate a sequence wherein slot reel 130 is initially spun and then stopped at a position, or reel stop, that corresponds to the selected symbol 134.

In the exemplary embodiment, motion of each slot reel 130 is controlled by stepper motor 144 based on, for example, motor parameters such as, but not limited to, acceleration constants and/or a desired step rate, and/or on slot reel assembly parameters such as a moment of inertia. For example, stepper motor 144 starts rotation of slot reel 130 from an initial stationary position, accelerates slot reel 130 to a desired rotational velocity, and then decelerates slot reel 130 in discrete steps. Finally, stepper motor 144 stops slot reel 130 at a desired reel stop that is transmitted by gaming machine controller 202 to the slot reel controller.

In some instances, such as prior to play by a player, gaming machine controller 202 initiates an attract sequence by transmitting a signal to stepper motor 144 to start rotation of slot reel 130. Moreover, gaming machine controller 202 transmits a signal to each light device 140 to enable frames 136 to be progressively or sequentially illuminated in order to create an appearance of animation within frames 136. Furthermore, in some instances, such as after a selection of a set of symbols 134 that qualifies the player for a bonus game, gaming machine controller 202 also transmits a signal to each light device 140 to enable frames 136 to be progressively or sequentially illuminated in order to create an appearance of animation within frames 136. More specifically, providing a plurality of frames 136 within symbols 134 enables a simulated animation to be displayed to a player without the use of a display screen, such as an LCD. Moreover, in the exemplary embodiment, each subsequent frame 136 is slightly different than a previous frame 136. Because each subsequent frame 136 is different than a previous frame 136, as frames 136 are sequentially illuminated, the player is provided with a simulated animated effect.

Light device 140 illuminates each sequential frame 136 by, for example, strobing on and off. More specifically, gaming machine controller 202 determines a desired spin rate for slot reel 130 and/or a desired period of illumination for each frame 136. Based on these values, stepper motor 144 rotates slot reel 130 at the desired spin rate and light device 140 strobes on and off at the desired period of illumination. In one embodiment, gaming machine controller 202 determines the desired spin rate and period of illumination based on, for example, a distance of spacing defined between each sequential frame 136. In an alternative embodiment, gaming machine controller 202 determines the desired spin rate based on the desired period of illumination, such that the spin rate and the period of illumination are inversely related. As such, in such an embodiment, the spin rate will increase as the period of illumination decreases, or the spin rate will decrease as the period of illumination increases. In another alternative embodiment, gaming machine controller 202 determines the spin rate and period of illumination based on a desired speed of perceived movement within frames 136. Moreover, in some embodiments, gaming machine controller 202 determines a desired intensity of illumination.

In one embodiment, a supplemental circuit board (not shown) includes a processor (not shown) that determines the desired spin rate, the period of illumination, and/or the intensity of illumination. In such an embodiment, the supplemental circuit board is coupled to gaming machine controller 202, and gaming machine controller 202 controls stepper motor 144 and light device 140 according to the desired spin rate, period of illumination, and/or intensity of illumination. Alternatively, the supplemental circuit board may override normal commands issued by gaming machine controller 202, thereby controlling the spin rate of stepper motor 144, and the period of illumination and/or intensity of illumination of light device 140.

In one embodiment, gaming machine controller 202 determines a desired spin rate for each reel 130 and a desired period of illumination for each light device 140. Gaming machine controller 202 transmits the desired spin rate to each stepper motor 144, and each stepper motor 144 rotates a corresponding reel 130 at the desired spin rate. Gaming machine controller 202 also transmits the desired period of illumination to each light device 140, and each light device 140 is energized or is strobed on and off at a rate that results in the desired period of illumination. In one embodiment, each stepper motor 144 begins to rotate each respective reel 130 at the same time, and each light device 140 begins to illuminate frames 136 at the same time in order to create a uniform appearance of animation by each reel 130. In another embodiment, a first stepper motor 144 begins to rotate a first corresponding reel 130 and a first light device 140 begins to illuminate only frames 136 of the first corresponding reel 130. After a predetermined wait time, a second stepper motor 144 begins to rotate a second corresponding reel 130 and a second light device 140 begins to illuminate frames 136 of the second corresponding reel 130. Staggering the rotation of reels 130 and the illumination of each set of frames 136 creates an appearance of animation within each set of frames 136 and across reels 130.

Figure 7:
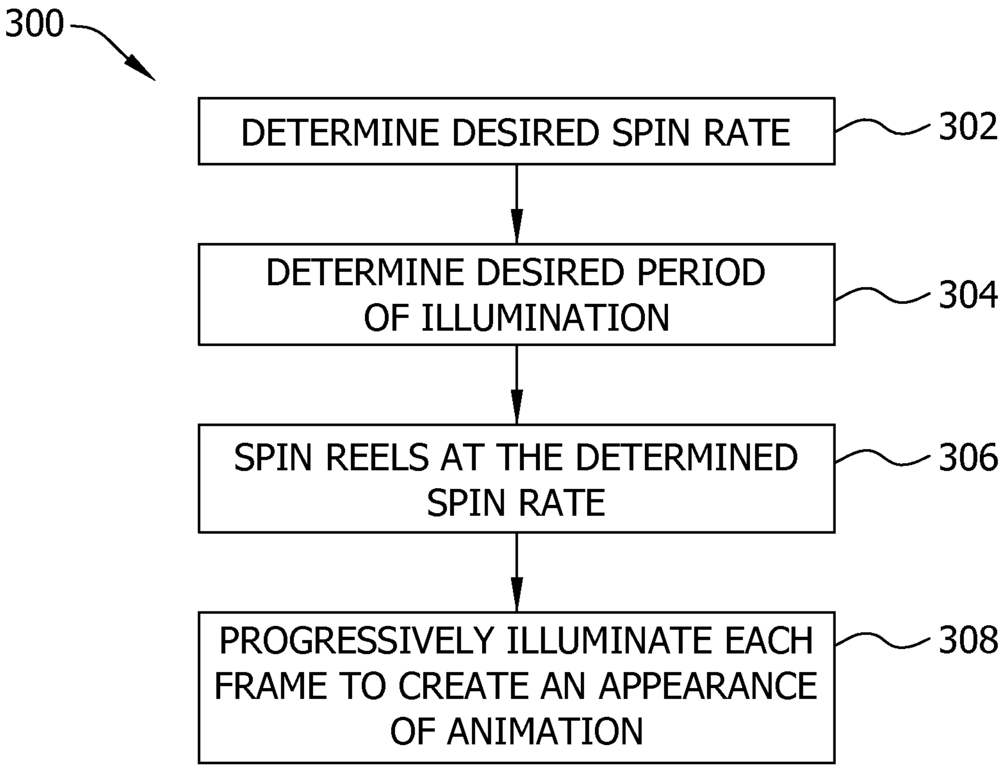
FIG. 7 is a flowchart illustrating a method for displaying a plurality of symbols using the gaming machine shown in FIG. 1.

FIG. 7 is a flowchart 300 illustrating an exemplary method for displaying a plurality of symbols, such as symbols 134 (shown in FIGS. 2-5), on a gaming machine, such as gaming machine 100 (shown in FIGS. 1 and 2). In the exemplary embodiment, gaming machine controller 202 (shown in FIG. 6) determines 302 a desired period of illumination for each light device 140 (shown in FIGS. 2 and 3). Gaming machine controller 202 also determines 304 a desired spin rate for each reel 130 (shown in FIGS. 1 and 2). In one embodiment, gaming machine controller 202 determines the desired spin rate and period of illumination based on, for example, a distance between each sequential frame 136. In an alternative embodiment, gaming machine controller 202 determines the desired spin rate based on the desired period of illumination, such that the spin rate and the period of illumination are inversely related. As such, in such an embodiment, the spin rate will increase as the period of illumination decreases, or the spin rate will decrease as the period of illumination increases. In another alternative embodiment, gaming machine controller 202 determines the spin rate and period of illumination based on a desired speed of perceived movement within frames 136. Moreover, in some embodiments, gaming machine controller 202 determines a desired intensity of illumination.

In the exemplary embodiment, gaming machine controller 202 transmits the desired spin rate to each stepper motor 144 (shown in FIGS. 2 and 3), and each stepper motor 144 rotates or spins 306 a corresponding reel 130 at the desired spin rate. Gaming machine controller 202 also transmits the desired period of illumination to each light device 140, and each light device 140 strobes on and off at a rate that results in the desired period of illumination, thereby progressively illuminating 308 each frame 136 to create an appearance of animation along reel strip 132 (shown in FIGS. 2-5) as the corresponding reel 130 rotates. Alternatively, each light device 140 may strobe on and off such that only a portion of frames 136 is illuminated. In one embodiment, each stepper motor 144 begins to rotate each respective reel 130 at the same time, and each light device 140 begins to illuminate frames 136 at the same time in order to create a uniform appearance of animation by each reel 130. In another embodiment, a first stepper motor 144 begins to rotate a first corresponding reel 130 and a first light device 140 begins to illuminate only frames 136 of the first corresponding reel 130. After a predetermined wait time, a second stepper motor 144 begins to rotate a second corresponding reel 130 and a second light device 140 begins to illuminate frames 136 of the second corresponding reel 130. Staggering the rotation of reels 130 and the illumination of each set of frames 136 creates an appearance of animation and/or movement within each set of frames 136 and across reels 130.

Figure 8:
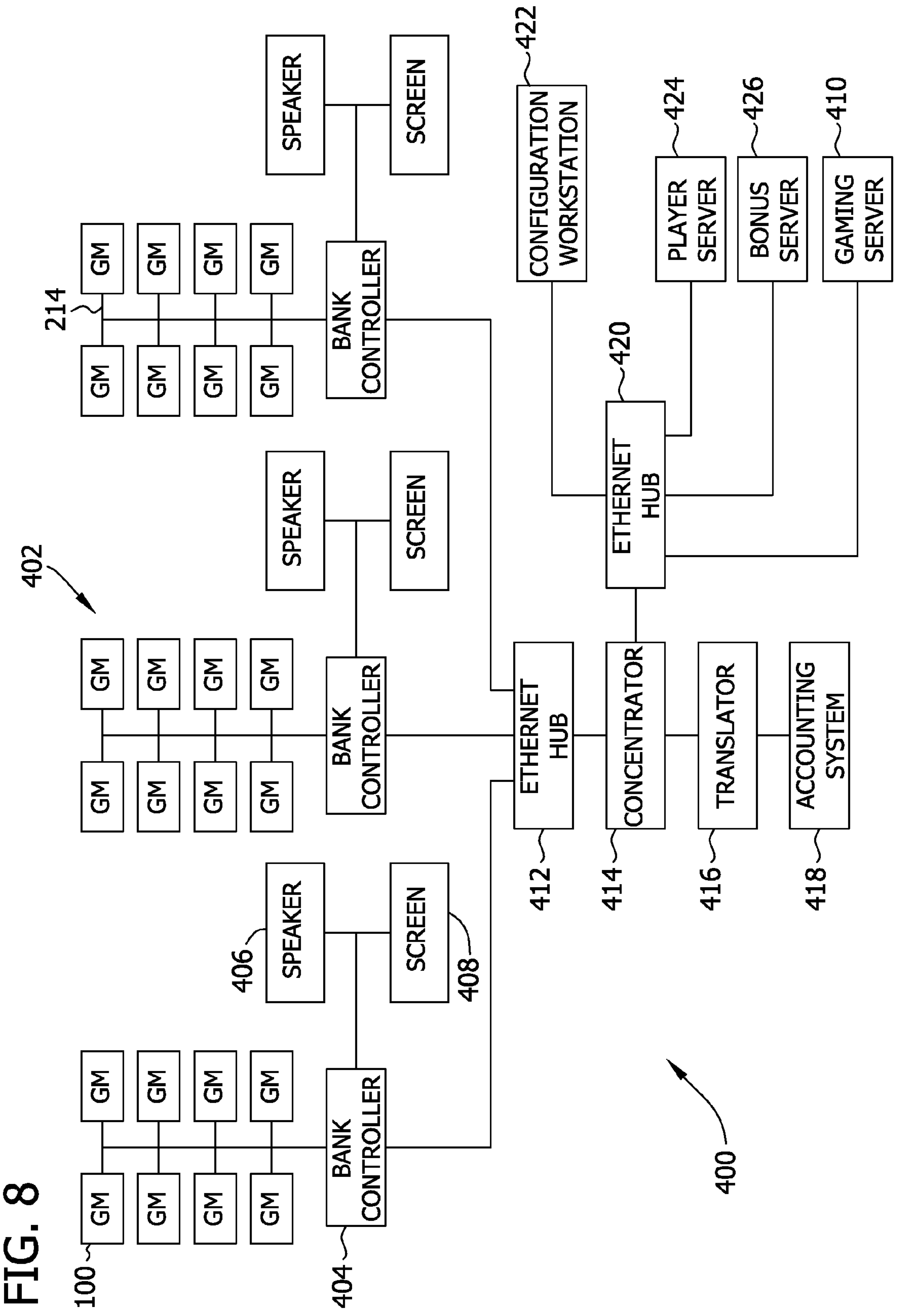
FIG. 8 is a block diagram of an exemplary gaming network that includes a plurality of the gaming machines shown in FIG. 1.

FIG. 8 is a block diagram of an exemplary gaming network 400 that includes a plurality of gaming machines 100. Specifically, FIG. 8 shows three banks 402 of gaming machines 100. Each gaming machine 100 is coupled via a network connection 214 to a bank controller 404. In one embodiment, each bank controller 404 includes a processor (not shown) that facilitates data communication between each gaming machine 100 within each bank 402, and between each gaming machine 100 and other components of gaming network 400. In one embodiment, each bank controller 404 also includes audio capabilities, such as a CD-ROM drive (not shown) or DVD-ROM drive (not shown), that are coupled to a sound card (not shown) for processing and transmitting digitized sound effects to one or more speakers (not shown) in response to commands issued over gaming network 400 by bank controller 404. Each bank controller 404 is also coupled via gaming network 400 to a speaker 406 and/or an electronic sign or screen 408 that displays information, such as via scrolling and/or flashing messages that indicate, for example, progressive and/or jackpot amounts, and that are visible to players playing gaming machines 100. Messages for display on each electronic screen 408 are generated and/or modified in response to commands issued over gaming network 400 by bank controller 404. A portion of gaming machines 100 may include video poker machines, video slot machines, and/or other similar gaming machines that implement alternative games, wherein the actual games, including random number generation and/or outcome determination, are performed at a remote gaming server 410.

A network connector, such as an Ethernet hub 412, couples each bank controller 404 to a concentrator 414. Concentrator 414 functions as a data control switch that routes data from each bank 402 to a translator 416. Translator 416 provides a compatibility buffer (not shown) between concentrator 414 and an accounting system 418. Moreover, translator 416 converts data gathered from each bank 402 into a format that is compatible with accounting system 418.

Another Ethernet hub 420 couples concentrator 414 to a configuration workstation 422, a player server 424, and to one or more bonus servers 426. Configuration workstation 422 includes a user interface that enables an administrator to set up and/or to modify portions of gaming network 400 and/or servers 410, 424, and 426. Player server 424 tracks data of players using gaming machines 100. Player server 424 also controls messages that appear on each video display monitor 122 and/or information panel 124 of gaming machines 100. In the exemplary embodiment, player server 424 also stores physical characteristics of players, such as the player age and/or vision data. Bonus server 426 controls bonus applications or bonus systems on gaming network 400. Bonus server 426 includes a set of rules for awarding jackpots in excess of those established by winning pay tables (not shown) of each gaming machine 100. Some bonus awards may be awarded randomly, while other bonus awards may be made to groups of gaming machines 100 operating in a progressive jackpot mode.

During operation, gaming network 400 operates substantially similar to gaming machine 100. In some instances, such as prior to play by a player, player server 424, for example, may initiate an attract sequence by transmitting a signal to gaming machine controller 202 (shown in FIG. 6) of unoccupied gaming machines 100 a signal to initiate the operations described above. Moreover, in some instances, a result outcome of a particular gaming machine 100 may include one of a number of predetermined triggering events. Such triggering events may include a particular combination of symbols 134, or any other suitable game event that may be desired. In the exemplary embodiment, bonus server 426 detects a triggering event and transmits to gaming machine controller 202 of each gaming machine 100 a signal to initiate the operations described above. More specifically, bonus server 426 determines one or more eligible gaming machines 100 within one or more banks 402.

Player server 424 or bonus server 426 transmits the signal to each gaming machine controller 202. In turn, each gaming machine controller 202 transmits a signal to each light device 140 (shown in FIG. 2) that frames 136 (shown in FIGS. 2-5) should be progressively illuminated in order to create an appearance of movement within frames 136. More specifically, providing a plurality of frames 136 within symbols 134 enables a simulated animation to be displayed to a player without the use of a display screen, such as an LCD. Moreover, in the exemplary embodiment, each subsequent frame 136 is slightly different than a previous frame 136. Because each subsequent frame 136 is different than a previous frame 136, as frames 136 are sequentially illuminated, the player is provided with a simulated animated effect.

Light device 140 illuminates each sequential frame 136 by, for example, strobing on and off. More specifically, gaming machine controller 202 determines a desired spin rate for slot reel 130 (shown in FIG. 2) and/or a desired period of illumination for each frame 136. Based on these values, stepper motor 144 (shown in FIG. 2) rotates slot reel 130 at the desired spin rate and light device 140 strobes on and off at the desired period of illumination. In one embodiment, gaming machine controller 202 determines the desired spin rate and period of illumination based on, for example, a distance between each sequential frame 136. In an alternative embodiment, gaming machine controller 202 determines the desired spin rate based on the desired period of illumination, such that the spin rate and the period of illumination are inversely related. As such, in such an embodiment, the spin rate will increase as the period of illumination decreases, or the spin rate will decrease as the period of illumination increases. In another alternative embodiment, gaming machine controller 202 determines the spin rate and period of illumination based on a desired speed of perceived movement within frames 136. Moreover, in some embodiments, gaming machine controller 202 determines a desired intensity of illumination. In one embodiment, a supplemental circuit board (not shown) includes a processor (not shown) that determines the desired spin rate, period of illumination, and/or intensity of illumination. In such an embodiment, the supplemental circuit board is coupled to gaming machine controller 202, and gaming machine controller 202 controls stepper motor 144 and light device 140 according to the desired spin rate, period of illumination, and/or intensity of illumination. Alternatively, the supplemental circuit board may override normal commands issued by gaming machine controller 202, thereby controlling the spin rate of stepper motor 144, and the period of illumination and/or intensity of illumination of light device 140.

In one embodiment, player server 424 or bonus server 426 determines a desired spin rate for each reel 130 and a desired period of illumination for each light device 140. Player server 424 or bonus server 426 then transmits the desired spin rate and period of illumination to gaming machine controller 202 of each eligible gaming machine 100. Gaming machine controller 202 transmits the desired spin rate to each stepper motor 144, and each stepper motor 144 spins a corresponding reel 130 at the desired spin rate. Gaming machine controller 202 also transmits the desired period of illumination to each light device 140, and each light device 140 strobes on and off at rate that results in the desired period of illumination. As described above, in on embodiment, each stepper motor 144 begins to spin the corresponding reel 130 at the same time, and each light device 140 begins to illuminate frames 136 at the same time in order to create a uniform appearance of animation by each reel 130. In another embodiment, a first stepper motor 144 begins to rotate a first corresponding reel 130 and a first light device 140 begins to illuminate frames 136 of the first corresponding reel 130. After a predetermined wait time, a second stepper motor 144 begins to rotate a second corresponding reel 130 and a second light device 140 begins to illuminate frames 136 of the second corresponding reel 130. Staggering the rotation of each reel 130 and the illumination of each set of frames 136 creates an appearance of animation and/or movement within each set of frames 136 and across reels 130.

The systems, methods, and apparatus described herein facilitate using a secondary light device to progressively illuminate a set of symbols on a gaming machine, wherein the set of symbols includes a plurality of frames. Progressively illuminating the frames creates an appearance of animation and/or movement within the frames. Creating the appearance of movement while mechanically-driven slot reels rotate facilitates providing players that prefer mechanically-driven slot reel games with an exciting animation sequence that increases player anticipation when, for example, waiting for the slot reels to stop during play of a base game, or when a bonus-game-triggering event occurs during play of a base game. Moreover, the appearance of movement facilitates enabling attract sequences using the mechanically-driven slot reels to attract potential players.

When introducing elements of aspects of the invention or embodiments thereof, the articles "a," "an," "the," and "said" are intended to mean that there are one or more of the elements. The terms "comprising," including," and "having" are intended to be inclusive and mean that there may be additional elements other than the listed elements.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A gaming machine comprising:

a reel assembly comprising:

at least one slot reel comprising a reel strip for displaying the outcome of a game positioned thereon, the reel strip comprising a plurality of frames for displaying an appearance of animation positioned thereon, said at least one slot reel configured to rotate about an axis at a spin rate;

at least one light device positioned with respect to said at least one slot reel to selectively illuminate said plurality of frames; and a processor operatively coupled to said reel assembly, said processor configured to control said at least one slot reel and at least one light device to sequentially illuminate at least a portion of said plurality of frames to display the appearance of animation within said plurality of frames during rotation of said at least one slot reel about the axis, said processor also configured to:

selectively control an intensity of illumination of the at least one light and the spin rate of the slot reel based on a desired speed.

2. A gaming machine in accordance with claim 1, wherein a first portion of said plurality of frames is positioned along a first outer edge of said reel strip, said at least one light device configured to sequentially illuminate at least the first portion of said first plurality of frames to facilitate an appearance of animation within said first portion during rotation of said at least one slot reel about the axis.

3. A gaming machine in accordance with claim 2, wherein a second portion of said plurality of symbols is positioned along a second outer edge of said reel strip, said reel assembly further comprising a secondary light configured to illuminate said second portion.

4. A gaming machine in accordance with claim 1, wherein said at least one light device is configured to sequentially illuminate each frame of said plurality of frames by being selectively energized and de-energized based on a spin rate at which said at least one slot reel rotates about the axis.

5. A gaming machine in accordance with claim 1, wherein said reel assembly further comprises a stepper motor coupled to said at least one slot reel and to said processor, said stepper motor configured to rotate said at least one slot reel about the axis based on one of a plurality of spin rate values received from said processor.

6. A gaming machine in accordance with claim 1, wherein said processor is configured to control a time period of illumination by said at least one light device.

7. A gaming machine in accordance with claim 6, wherein the processor determines the time period of illumination of said at least one light device based on a spin rate of the slot reel such that the time period of illumination and the spin rate are inversely related.

8. A gaming machine in accordance with claim 1, wherein said processor is configured to determine an intensity of illumination by said at least one light device.

9. A gaming machine in accordance with claim 1, wherein said processor comprises a gaming machine controller.

10. A gaming machine in accordance with claim 1, wherein said processor comprises a circuit board coupled to a gaming machine controller.

11. A gaming machine in accordance with claim 1, wherein said at least one slot reel comprises a plurality of slot reels and said at least one light device comprises a plurality of light devices, each light device of said plurality of light devices positioned adjacent to a corresponding slot reel of said plurality of slot reels.

12. A gaming machine in accordance with claim 11, wherein said processor is configured to facilitate an appearance of animation across said plurality of slot reels by:

controlling a respective period of illumination of each of said plurality of light devices; and controlling an order in which each of said plurality of light devices is illuminated.

13. A gaming machine in accordance with claim 1, wherein the processor determines one of a desired spin rate of the slot reel or a desired time period of illumination of said at least one light device based on a spacing distance between adjacent frames.

14. A gaming machine comprising:

a first reel assembly; and a second reel assembly, each of the first reel assembly and the second reel assembly further comprising:

at least one slot reel comprising a reel strip for displaying the outcome of a game positioned thereon, the reel strip comprising a plurality of frames for displaying an appearance of animation positioned thereon;

at least one light device positioned with respect to said at least one slot reel, said at least one light device configured to sequentially illuminate at least a first portion of said plurality of frames to facilitate an appearance of animation within said plurality of frames; and at least a second light device positioned with respect to said at least one slot reel, said at least second light device configured to sequentially illuminate at least a second portion of said plurality of frames to facilitate a second appearance of animation within said plurality of frames; and a processor operatively coupled to said first reel assembly and the second reel assembly to facilitate an appearance of animation across said plurality of slot reels, wherein the processor is further configured to selectively control the spin rate of at least one slot reel based on a desired speed.

15. A gaming machine in accordance with claim 14, wherein the first portion of said plurality of frames is positioned along an outer edge of said reel strip, said at least one light device configured to progressively illuminate at least a portion of said first plurality of frames to facilitate an appearance of animation within said first portion of frames.

16. A gaming machine in accordance with claim 15, wherein the second portion of said plurality of frames is positioned along a center region of said reel strip, said reel assembly further comprising a secondary light configured to illuminate said second portion of frames.

17. A gaming machine in accordance with claim 14, wherein said at least one light device is configured to sequentially illuminate at least a portion of said plurality of frames by being energized and de-energized based on a spin rate at which said at least one slot reel rotates about the axis.

18. A gaming machine in accordance with claim 14, wherein said reel assembly further comprises a stepper motor coupled to said at least one slot reel, said stepper motor configured to rotate said at least one slot reel about the axis.

19. A gaming machine in accordance with claim 14, wherein said at least one light device is configured to vary a period of illumination.

20. A gaming machine in accordance with claim 14, wherein the reel assembly rotates at a rate of rotation, said at least one light device is configured to vary an intensity of illumination at a rate related to the rate of rotation.

21. A reel assembly in accordance with claim 14, wherein said at least one slot reel comprises a plurality of slot reels and said at least one light device comprises a plurality of light devices, each light device of said plurality of light devices positioned adjacent to a corresponding slot reel of said plurality of slot reels.

22. A reel assembly in accordance with claim 21, wherein each light device of said plurality of light devices is configured to illuminate at least a portion of said plurality of frames in a predetermined order beginning with a first slot reel of said plurality of slot reels and progressing to a final slot reel of said plurality of slot reels to facilitate an appearance of animation across said plurality of slot reels.

23. A method of displaying a plurality of indicia on a gaming machine, said method comprising:

rotating at least one slot reel about an axis at a spin rate using a stepper motor, the at least one slot reel including a reel strip for displaying the outcome of a game positioned thereon, the reel strip comprising a plurality of frames positioned thereon; and sequentially illuminating at least a portion of the plurality of frames using at least one light device to facilitate an appearance of animation within the plurality of frames while the at least one slot reel rotates about the axis, wherein an intensity of illumination by the at least one light device and the spin rate of the slot reel are selectively controlled by a processor coupled to the at least one light device and the at least one slot reel.

24. A method in accordance with claim 23, wherein the plurality of frames includes a first portion and a second portion, the first portion of frames positioned along an outer edge of the reel strip, the second portion of frames positioned along a central region of the reel strip, said illuminating at least a portion of the first plurality of frames comprises sequentially illuminating the outer edge of the reel strip using the at least one light device while the at least one slot reel rotates about the axis.

25. A method in accordance with claim 23, wherein the processor is coupled to the stepper motor.

26. A method in accordance with claim 23, wherein illuminating at least a portion of the plurality of frames comprises determining a period of illumination using a processor coupled to the at least one light device.

27. A method in accordance with claim 23, wherein the gaming machine includes a plurality of slot reels, one of the plurality of slot reels starting to spin at a first time and another of the plurality of slot reels starting to spin at a time staggered from the first time.

28. A method in accordance with claim 23, wherein the gaming machine includes a plurality of slot reels and a plurality of light devices, said illuminating each frame of the plurality of frames comprises:

sequentially illuminating each frame of the plurality of frames on a first slot reel of the plurality of slot reels while the first slot reel rotates about the axis; and sequentially illuminating each frame of the plurality of frames on a second slot reel of the plurality of slot reels while the second slot reel rotates about the axis.

29. A gaming system comprising:

a plurality of gaming machines that each comprise:

a reel assembly comprising:

at least one slot reel comprising a reel strip for displaying the outcome of a game positioned thereon, the reel strip comprising a plurality of frames for displaying an appearance of animation positioned thereon, said at least one slot reel configured to rotate about an axis at a spin rate;

at least one light device positioned with respect to said at least one slot reel to selectively illuminate said plurality of frames; and a processor operatively coupled to said reel assembly, said processor configured to control said at least one slot reel and at least one light device to sequentially illuminate at least a portion of said plurality of frames to display the appearance of animation within said plurality of frames during rotation of said at least one slot reel about the axis, said processor also configured to:

selectively control an intensity of illumination of the at least one light and the spin rate of the slot reel based on a desired speed; and a server communicatively coupled to each said processor, said server configured to:

determine whether at least one gaming machine of said plurality of gaming machines is eligible for a bonus game;

transmit a signal to said processor of said at least one eligible gaming machine to enable the sequential illumination of said plurality of frames;

determine a desired spin rate of said at least one slot reel of said at least one eligible gaming machine; and transmit the desired spin rate to said at least one eligible gaming machine.

30. A gaming system in accordance with claim 29, wherein said server is configured to determine a time period of illumination by said at least one light device of said at least one eligible gaming machine.

31. A gaming system in accordance with claim 29, wherein each gaming machine of said plurality of gaming machines comprises a plurality of slot reels and a plurality of light devices, each light device of said plurality of light devices positioned with respect to a corresponding slot reel of said plurality of slot reels.

32. A gaming system in accordance with claim 31, wherein said server is configured to facilitate an appearance of animation across said plurality of slot reels of each said eligible gaming machine by:

determining a period of illumination of each of said plurality of light devices of said at least one eligible gaming machine;

determining an order of illumination of each of said plurality of light devices of said at least one eligible gaming machine; and transmitting the signal to said processor of said at least one eligible gaming machine to enable each of said plurality of light devices to illuminate at least a portion of said plurality of frames in a predetermined order beginning with a first slot reel of said plurality of slot reels and progressing to a final slot reel of said plurality of slot reels to facilitate an appearance of animation across said plurality of slot reels as each of said plurality of slot reels rotates about the axis.

* * * * *